United States Patent [19]

Westwood et al.

[11] 4,366,488
[45] Dec. 28, 1982

[54] READ/WRITE ARRANGEMENT FOR A MAGNETIC TERMINAL

[75] Inventors: William D. Westwood, Nepean; Steven Kos, Kanata; Herman W. Willemsen, Nepean, all of Canada

[73] Assignee: Northern Telecom Limited, Montreal, Canada

[21] Appl. No.: 136,533

[22] Filed: Apr. 2, 1980

[51] Int. Cl.³ .............................................. G11B 5/02
[52] U.S. Cl. .................................. 346/74.3; 346/74.2; 360/118; 361/121
[58] Field of Search .................... 346/74.2, 74.3, 74.5, 346/139 D, 139 C; 101/DIG. 5; 360/66, 88, 118; 361/149–152

[56] References Cited

U.S. PATENT DOCUMENTS

| | | | |
|---|---|---|---|
| 3,149,901 | 9/1964 | Hagelbarger | 346/139 D X |
| 3,633,720 | 1/1972 | Tyler | 346/74.5 |
| 3,683,382 | 8/1972 | Ballinger | 346/74.3 |
| 3,772,471 | 11/1973 | Imai et al. | 360/118 |
| 4,001,841 | 1/1977 | Berkowitz | 346/74.5 |
| 4,054,922 | 10/1977 | Fichter | 346/74.3 |
| 4,063,296 | 12/1977 | Fremstedal et al. | 360/118 |
| 4,072,957 | 2/1978 | Kokaji et al. | 346/74.5 X |

Primary Examiner—Stuart N. Hecker
Attorney, Agent, or Firm—Stuart L. Wilkinson

[57] ABSTRACT

A terminal has a reciprocating print head bearing a series of linearly arranged, individually-magnetizable styli for printing on magnetic particle oriented paper. The terminal may be used as a printer, or as a display by combining the printer with an erasing head comprising a series of linearly arranged magnets which create a rotating magnetic field to erase the magnetic particle oriented paper when the erasing head is reciprocated. The print and erase heads are mounted on a common carriage. The terminal is cheap to manufacture and, if used as a printer, has the advantage of reusable paper. If used as a display, it required no refresh.

6 Claims, 7 Drawing Figures

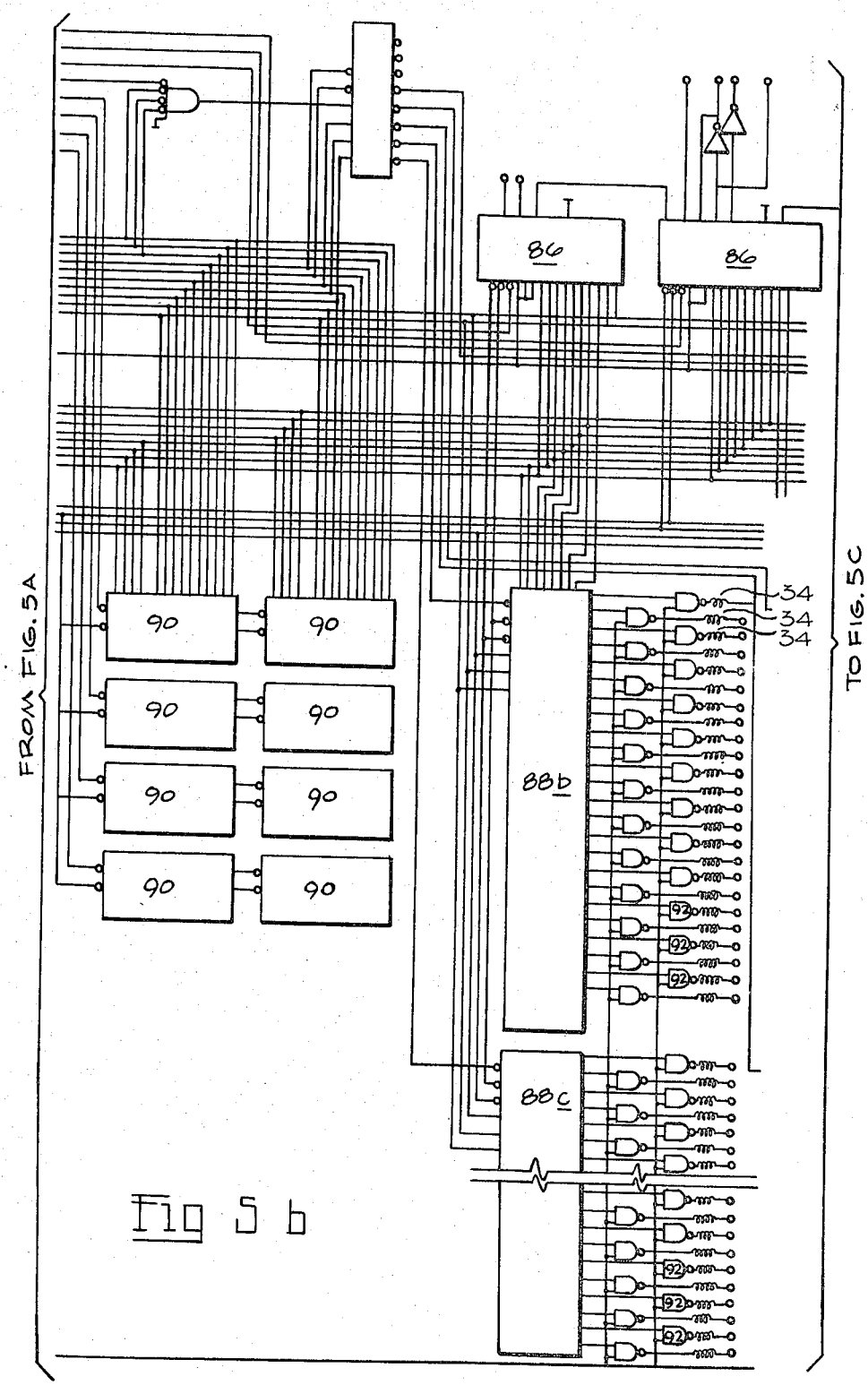

READ/WRITE ARRANGEMENT FOR A MAGNETIC TERMINAL

This invention relates to a reciprocating head terminal utilizing magnetic particle oriented paper (MPOP). The terminal may be used as a printer or as a display.

Various types of printer are used for printing graphics and alphanumerics. Typical examples are ink jet printers, impact printers and thermal printers. To take advantage of high bandwidth obtainable using, for example, fiber optic links, modern printers must have the capacity for high print rate. However there is also the somewhat conflicting demand for high resolution. Maximum character rates of these three types of printer are approximately 600 characters per second for ink jet printers and thermal printers and 300 characters per second for impact printers.

Impact printers, which use the typewriter principle of a hammer acting through a print ribbon, produce a considerable amount of noise and, consequently, aural discomfort.

Ink jet printers have proved popular because, in addition to offering rapid printout, they are quiet. However they require complex ink deflection schemes and it is difficult to site ink ejection orifices close together. Moreover, there is a problem of definition resulting from ink mist that can result, especially when operating at high print speeds. Finally, great care must be taken to monitor changes in ink viscosity caused by evaporation from the circulating ink in order that ink ejection nozzles do not become blocked.

Thermal printers, which use Joule effect heating of resistors, provide one of the most simple printer constructions but, especially in the case of matrix-addressed printers, they are prone to deterioration of contrast owing to stray currents appearing at non-selected print resistors.

Considering displays, the market standard is still the cathode ray tube display. Although offering many benefits including high resolution and reliability, it is expensive to manufacture, requiring a vacuum tube and complex beam deflection arrangements. Furthermore, as is the case with potential replacements for the cathode ray tube such as flat panel liquid crystal displays (LCD's), refresh is needed to maintain the displayed information. Although the liquid crystal display represents a likely substitute for the cathode ray tube in some applications, the logistics of fabricating a display having a liquid flanked by glass panels supporting a lattice work of drive circuitry are formidable.

This invention proposes a termial which may be adapted to a printer or a display, which is easy to construct, cheap to power, and which, in the case of a display, does not require refresh.

The terminal uses a recording material known as magnetic particle oriented paper (MPOP) which was developed and is made by Honeywell Corporation. MPOP has a supporting plastics base on, one surface of which is a globular transparent matrix, each globule containing a mass of elongate particles which may be likened to microscopic iron filings. When a magnetic flux with field lines perpendicular to the MPOP is applied, the elongate particles move into alignment with the field lines in the region over which the flux is applied. In consequence, the reflectivity of the paper is locally reduced. Because of the particular underlying supporting base and the matrix material chosen by Honeywell, the reflectivity reduction is associated with a colour change from silver to dark green.

The recommended practice for writing on the MPOP is by the use of a magnetized stylus, a soft iron backing plate being located behind the MPOP to localize flux. To erase information recorded on the MPOP, the MPOP is subjected to a rotating magnetic field in the plane of the paper. The recommended practice for erasure is to pass the MPOP through an A.C. energized coil, then to turn the MPOP through a right angle and to repeat the pass.

The present invention proposes utilizing the MPOP in combination with a reciprocating head to produce a terminal comprising an elongate writing means for recording information on magnetic particle oriented paper, said writing means having a plurality of linearly distributed writing elements, means for advancing a sheet of magnetic particle oriented paper past said writing means, and means for longitudinally stepwise reciprocating said writing means in a direction perpendicular to the direction of advance of said magnetic particle oriented paper.

In its simplest aspect, the terminal is used as a printer. Although the MPOP is somewhat more expensive than ordinary paper, MPOP has the additional merit that the recorded information is easily erased, when desired, permitting the MPOP to be reused.

It has been ascertained that a rotating magnetic field for MPOP erasure is readily generated by longitudinally reciprocating a composite magnetized bar characterized by north and south poles alternating along the bar edge.

This is utilized to adapt the terminal hereinbefore defined to a display terminal, the display terminal further comprising said sheet in the form of a continuous roll, and spaced from said writing means, an elongate erasing means for erasing information recorded on the MPOP, said erasing means having a plurality of linearly distributed erasing elements, and means for longitudinally reciprocating said erasing means in a direction perpendicular to the direction of advance of said roll.

Preferably said means for longitudinally reciprocating said writing means and the means for longitudinally reciprocating said erasing means have a common drive means.

Each of said writing elements preferably comprises an elongate stylus of high magnetic permeability, low magnetic coercivity material, the writing means including energizing means for selectively magnetizing said styli, and a soft iron member located on the distal side of said MPOP from said styli, the styli and said member located such as to produce a magnetic flux generally perpendicular to the MPOP when said styli are magnetized.

Each of said erasing elements preferably comprises a permanent magnet, the erasing elements arranged such that north and south magnetic poles alternate along said erasing means.

An embodiment of the invention will now be described by way of example with reference to the accompanying drawings in which:

FIGS. 5a–5c show specific circuit details of the schematic diagram of FIG. 4.

Figure 1:
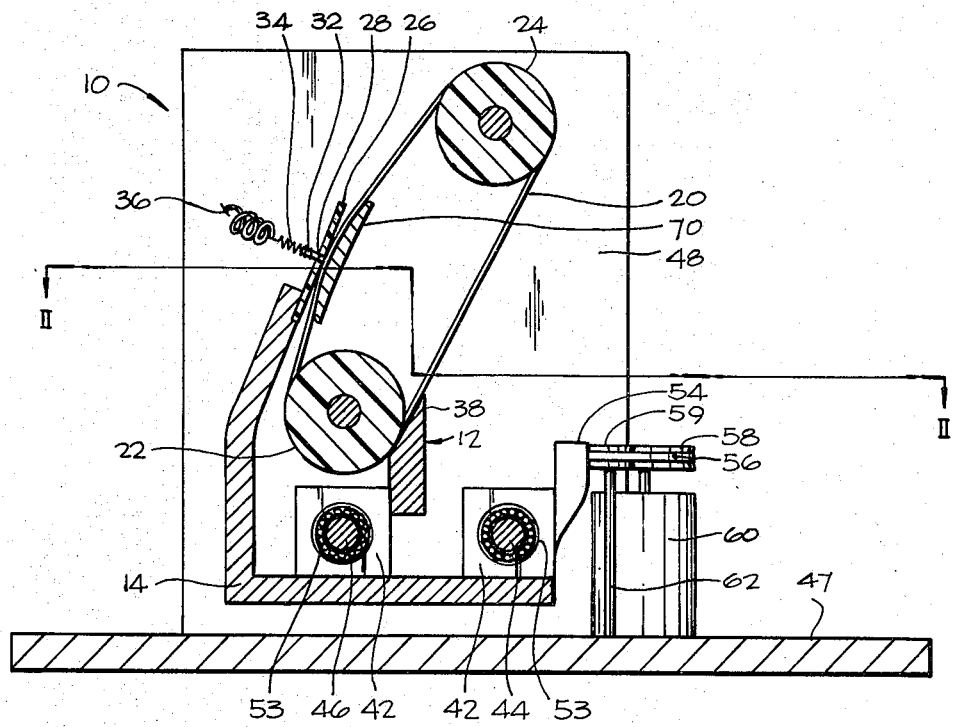
FIG. 1 is a cross-sectional view of a reciprocating head terminal according to the invention.
Figure 2:
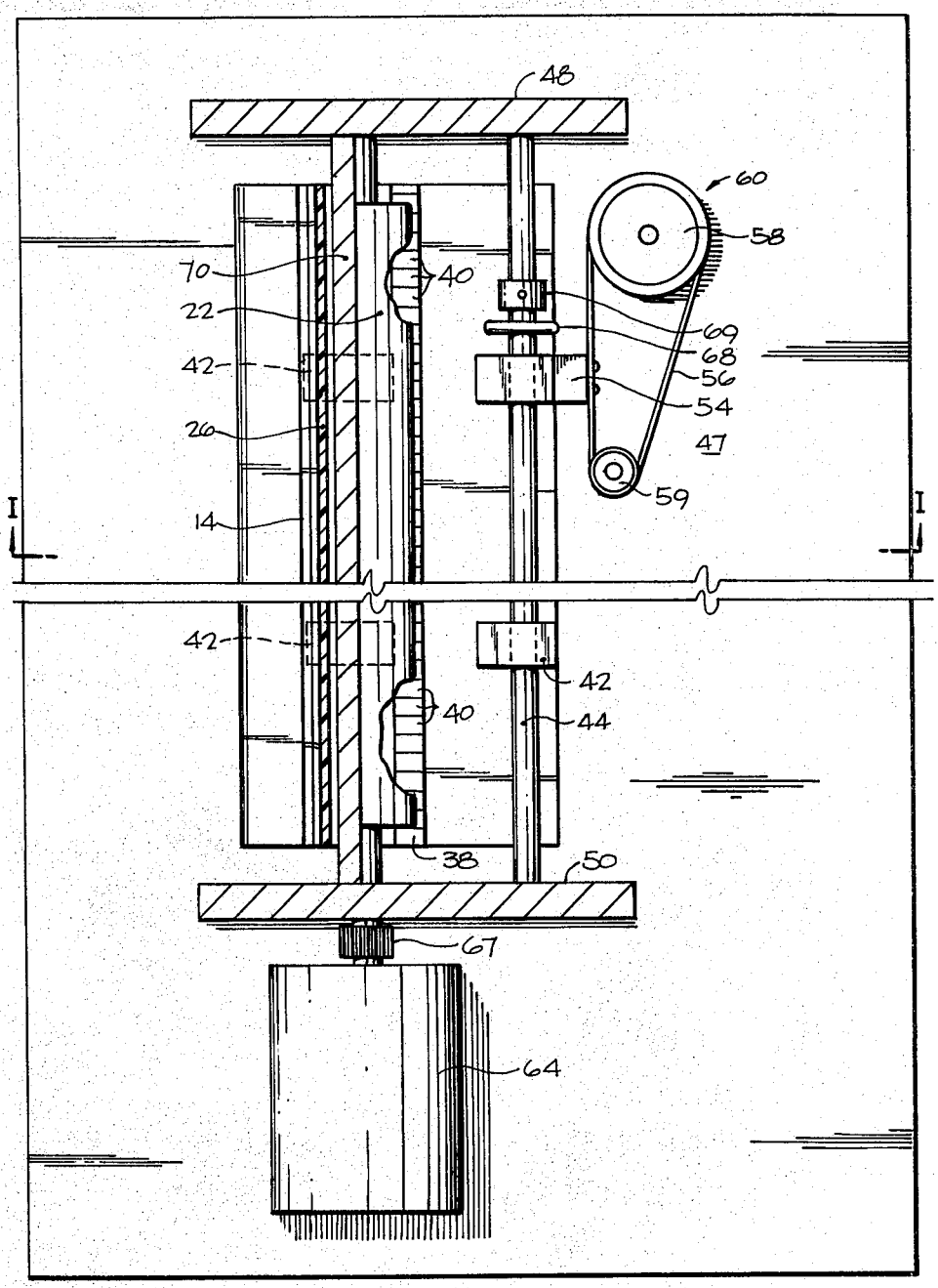
FIG. 2 is a longitudinal section on the line II—II of FIG. 1 but with paper removed.

Considering FIGS. 1 and 2 in detail, a print head 10 and an erase head 12 are mounted on a reciprocal carriage 14. Mounted adjacent the carriage 14 is a continuous roll 20 of magnetic particle oriented paper (MPOP), the roll being driven by a drive roller 22 and an idler roller 24. An outer surface of the roll 20, which is magnetically sensitive, is located closely adjacent the print and erase heads 10 and 12 respectively.

The print head 10 includes an elongate baseplate 26 of non-magnetizable material which is screwed to the carriage 14. Through the baseplate 26 at equispaced intervals of 25 mm extend styli 28. Each stylus 28 is a 0.5 diameter pin of annealed soft iron which has a high permeability and low coercivity. The pins are secured within the baseplate 26 by epoxy with their leading ends flush with the baseplate front surface. The styli have a 5 mm projection 32 extending rearwardly of the baseplate 26. A 50 turn coil 34 of insulated wire is wound on the projections 32 of the styli 28. Leads 36 to the coils 34 extend to control circuitry (not shown) described presently.

The erase head 12 includes a composite magnet 38 consisting essentially of a series of bar magnets 40, the magnetic south pole of each bar magnet 40 positioned next to the magnetic north pole of an adjacent bar magnet so that along each edge of the composite magnet 38, magnetic north and south poles alternate. When the composite magnet 38 is reciprocated along its axis, any point on the MPOP immediately adjacent the top edge of the composite magnet 38 experiences a rotating magnetic field. Typically, the bar magnets 40 are 15 mm wide and their magnetic field strength is about 1 Koe.

The composite magnet 38 is attached to one of a number of brackets 42 by means of which the carriage 14 is mounted on parallel cylindrical rails 44 and 46 extending between walls 48 and 50. Each of the brackets 42 incorporates ball bearing or nylon bush permitting the carriage to be reciprocated back and forth along the rails. One of the brackets has an upstanding projection 54 to which is bolted a steel band 56, the band 56 extending around pulleys 58 and 59 mounted respectively at a stepping motor 60 and at a pulley support 62 fixed to a base member 47. The steel band 56 is used to convert rotary motion of the stepping motor 60 to linear motion of the carriage 14, the band 56 being short in order that at each stepping cycle and, more importantly, at each carriage reversal, there is negligible extension of the band which might otherwise upset the stepping mode to be discussed presently. The carriage stepping motor 60 is mounted adjacent the wall 48, another stepping motor 64 for stepwise rotation of the drive roller 22 being mounted adjacent wall 50. Reduction gearing 67 ensures that stepwise rotation of the motor is converted into 5 mil/step circumferential movement of drive roller 22. A rubber grommet 68 is mounted adjacent a fixed collar 69 for sliding motion on the cylindrical rail 44.

One example of a stepping motor used for carriage stepping is manufactured by Sigma Instruments Inc., under specification 20 220D200/F6. The stepping motor consists essentially of a stator, which has a number of wound poles, each pole having a number of teeth as part of a flux distributing member. The motor operates by means of the interaction between a toothed rotor magnet biasing flux and magnetomotive forces generated by current in the stator windings. If the pattern of winding energization is fixed, there is a series of stable equilibrium points generated around the rotor. The rotor moves to the nearest of these and remains there. When the windings are excited in sequence, the rotor follows the changing pattern of equilibrium and rotates in response to that changing pattern.

In an alternative embodiment (not shown), the band 56 is obviated and drive is provided directly using a rotor having a screw threaded extension which engages an internally screw threaded bushing, the bushing ensuring that the rotor is stepped longitudinally for each rotation of the rotor.

In standard operating mode, the carriage 14 is moved stepwise 5 mil at a time and a current pulse is applied to selected coils 34 at each step depending on the identity of characters to be printed. Each pulse magnetizes the associated stylus 28 producing a localized flux with field lines extending from the stylus 28 through the roll of MPOP 20 to a soft iron backing plate 70 extending between the walls 48 and 50. As described previously, the flux causes reorientation of particles within the MPOP thus changing the reflectivity of the MPOP over a localized region. The carriage is stepped over a number of steps for a total traverse equal to the spacing of adjacent styli 28 whereupon the magnetic particle oriented paper is stepped 5 mil in a direction transverse to the carriage stepping direction by the motor 64.

The stepping motor 60 is used in the so-called slew mode which can best be understood by considering what happens when the stepping motor rotor is halted at the end of each carriage step. The rotor does not stop dead, but oscillates for a brief period. A torque minimum occurs when the stepping amplitude maxima are coincident with the amplitude minima of this oscillation. As the stepping frequency is increased, the slew mode is entered, stepping and oscillation come into phase, and torque is restored.

The motor identified previously has been operated with a stepping rate of 1500 steps per second. Rapid operation of the stepping motor at this and higher rates up to 4000 steps per second is made possible by ensuring that the four phases of drive current necesary for motor synchronization are accurately derived and temporally related and by ensuring that rise and fall times for drive current to the stepping motor are minimized. The method by which these are achieved is described in greater detail presently.

Figure 3:
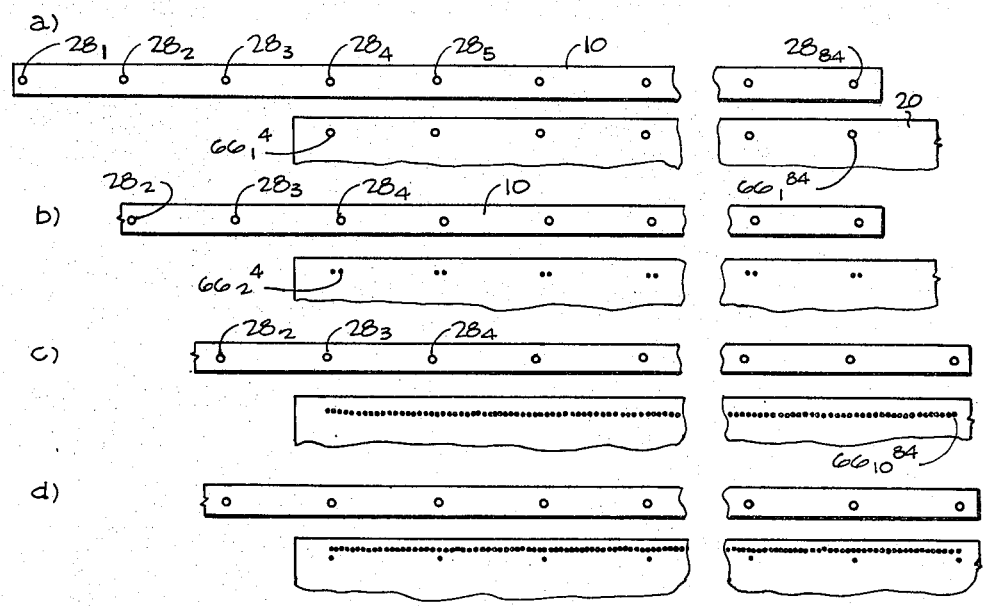
FIG. 3 shows, for one operating mode, the position of a reciprocating head and pels printed thereby as a function of time.

Considering FIG. 3, the length over which the series of styli 28 extends is greater than the length of a line of pels to be printed. The print head 10 has a total of 84 styli, each stylus 28 separated from its next adjacent stylus by 100 mil giving a total print head length of 8.4". The print head is used to print a line of up to 1600 pels 66 on MPOP, the 1600 pels having a total length of 8" (i.e. 200 lines per inch). The 0.4" difference between these two lengths enables faster print-out since it permits prolonged operation of the carriage stepping motor 60 in the slew mode.

At each carriage reciprocation, the carriage stepping motor direction is reversed, thereby destroying the slew mode and requiring that the stepping motor wind up through the minimum torque regime again. The extended print head length permits more than one line to be printed without interrupting slew mode operation. Thus, as shown in FIG. 3, at any time, four of the print coils 34 are not addressed by print pulse so their corresponding styli 28 are not magnetized. For illustrating convenience, relevant parts of the print head 10 at the MPOP 20 are shown vertically separate although, in practice, the print head 10 lies closely adjacent the MPOP to ensure localization of magnetic flux at the paper; in addition, in this description, data for printing is assumed to be a vertical series of horizontal lines. FIG. 3a shows the printing of pels $66_1{}^4$ to $66_1{}^{84}$ by each of the print styli $28_4$ to $28_{84}$. Similarly FIGS. 3b and 3c show the printing of pels $66_2{}^4$ to $66_2{}^{84}$ and FIG. 3c shows the printing of pels $66_{10}{}^4$ to $66_{10}{}^{84}$ thereby completing one line of pels. At this juncture, the MPOP 20 is advanced one line by the stepping motor 64, the stepping motor 60 meanwhile remaining in its slew mode, whereupon another line of pels is printed using styli $28_3$ through $28_{83}$ (FIG. 3d). The paper is then advanced another line to print using only print styli $28_2$ to $28_{82}$ and advanced a final line to print using only print styli $28_1$ to $28_{81}$.

Once the carriage 14 has reached the full extent of its right hand travel, drive to the carriage 14 is reversed. The carriage 14 is then stepped from right to left to print a subsequent four lines of pels. As an alternative the carriage can fly back to its original position without the print head 10 printing, but this is not preferred since the flyback period, which may be on the order of 1.6 mS for a twenty step flyback, is wasted. On the other hand, the only change required for printing from right to left is that data be reverse-loaded into a buffer memory and this reversal can be performed fairly rapidly. Indeed this illustrates a further advantage of the elongate print head 12 in that software controlled reversal of the data input direction need only take place every four lines rather than every line, thereby reducing processing time. Obviously, the step frequency of the motor 60 is somewhat slower while it is in the accelerating mode than when it reaches the slew mode. To compensate for this leading edges of the print pulses to coils 34 and the step pulses to motor 60 are synchronized. Although the extended print head 10 has been described in terms of extra print styli 28 permitting four line printing in uninterrupted slew mode, the particular number of extra styli is a matter of choice.

While the print head is printing on a top portion of the MPOP 20 extending between the rollers 22 and 24, the carriage reciprocation causes the composite magnet 38 at the erase head 23 to erase recorded information on a bottom portion of the MPOP as it passes by. The soft iron backing plate 70 which localizes the flux from styli 28 ensures that the magnetic field from the styli does not permeate through to the region of the MPOP adjacent the erase head 12 otherwise erasure might be incomplete.

As indicated previously the composite magnet 38 consists essentially of bar magnets 40 disposed head-to-tail. As the magnet 38 is axially reciprocated, a point adjacent one edge of the magnet experiences a magnetic field which rotates firstly in one direction and then in the opposite direction. The rotating field acting on the MPOP particles is strongest in the immediate vicinity of the composite magnet 38. The MPOP is thus subjected to a gradually weakening field after it has been stepped past the magnet 38, these being ideal conditions for erasure.

To convert the display into a printer proper (not shown), the erase head 12 is dispensed with and MPOP 20 is supplied to the terminal as and when needed instead of as a continuous loop of material.

In its display mode, the terminal has one overiding advantage that no refresh is needed. This may well compensate for the fact that the response time of the display is slow since the roll of MPOP 20 must undergo a complete revolution around the rollers 22 and 24 before the display information can be changed.

As a printer, the terminal has the merit of the MPOP being reusable, which may eventually compensate for the relative expense of the MPOP compared with ordinary paper.

In a standard operating mode, the printer prints pels of size 7 mil×7 mil on 5 mil centers. However, by altering the ratio of print rate to step rate, (either the print head step rate or the MPOP step rate, or both), the print characters can be made to appear more, or less, solid. Alternatively, the gear ratio of the drives from the stepping motors 60 and 64 can be altered by modifying the pulleys 58, 59 or reduction gearing 67.

In the embodiment described, 84 print styli 28 are arrayed linearly along the print head 10 and the stepping motor 64 advances the MPOP 20 one line of pels at a time. In an alternative arrangement (not shown) at each stylus position instead of one, there are 7 individually energizable styli, equispaced and linearly arranged on a line parallel to the feed direction of the MPOP 20. This enables the printing of a line 7×5 dot characters instead merely of a single line of pels at each carriage traversal. Drive leads to the coils are somewhat more numerous and the step distance of stepping motor 64 is somewhat greater in order to accommodate matrix character printing of this type.

Depending on the shape and permeability of the styli 28 and the influence of the backing plate 70, by variation of electrical pulse height to the coils 34, the solidity of print can be varied. Moreover, by altering the position of the soft iron backing plate 70, pel size can be altered through dispersion or concentration of the area over which the magnetic field produced at the energized coils effects reorientation of MPOP particles.

The printer/display of the invention is simple and cheap to fabricate and, if software controlled, offers great flexibility.

Figure 4:
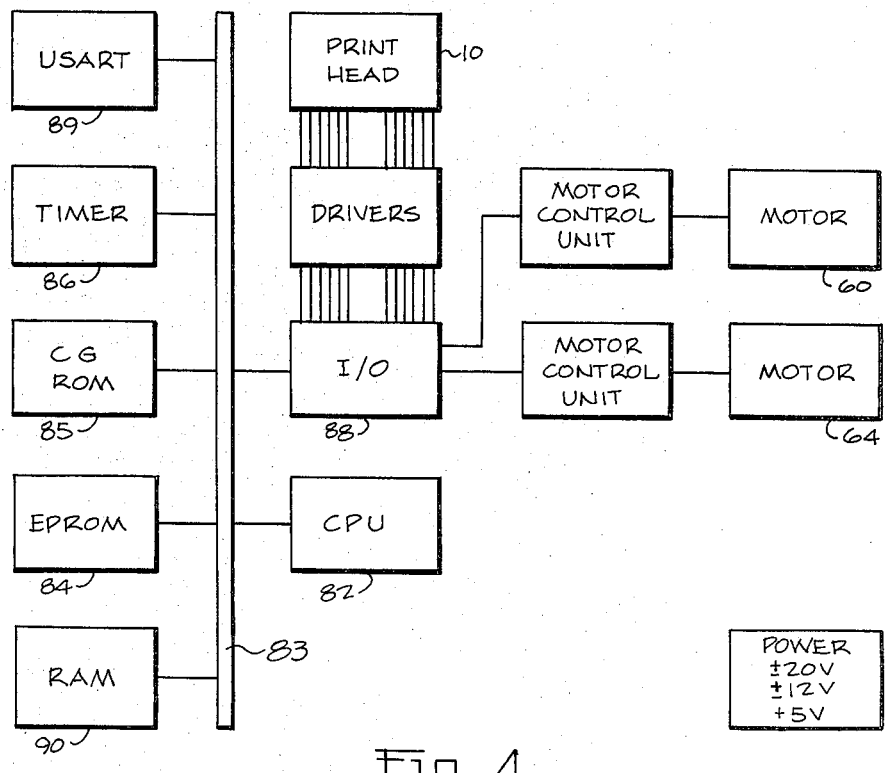
FIG. 4 shows a block schematic diagram of a control facility for the terminal of FIG. 1.

Turning to FIG. 4, there is illustrated in block schematic form a control facility for the magnetic printer. The control facility includes a central processing unit (CPU) 82, connected to a bus 83. Also connected to the bus are a universal synchronous asynchronous receiver transmitter (USART) 89, for receiving data from modems, typewriter, video or facsimile terminals and for transmitting that data via the CPU to a random access memory (RAM) 90, offering 4 Kbytes of storage, the actual memory capacity depending on resolution and speed desired. Also connected to the bus are timers 86, a character generator read-only-meory (CGROM) 85 from which, for example, 5×7, 7×9 and helvetica characters are derived from encoded data, and an electrically programmable read-only-memory (EPROM) 84, for controlling overall operation. Also controlled by the CPU are parallel input/output ports 88 (I/O) which drive control logic to the carriage stepping motor 60, the MPOP stepping motor 64 and the print styli 28. A power supply to the control facility provides a 20 volt supply for energization of the coils 34, and ±12 volts and +5 volts for the logic.

Figure 5A:
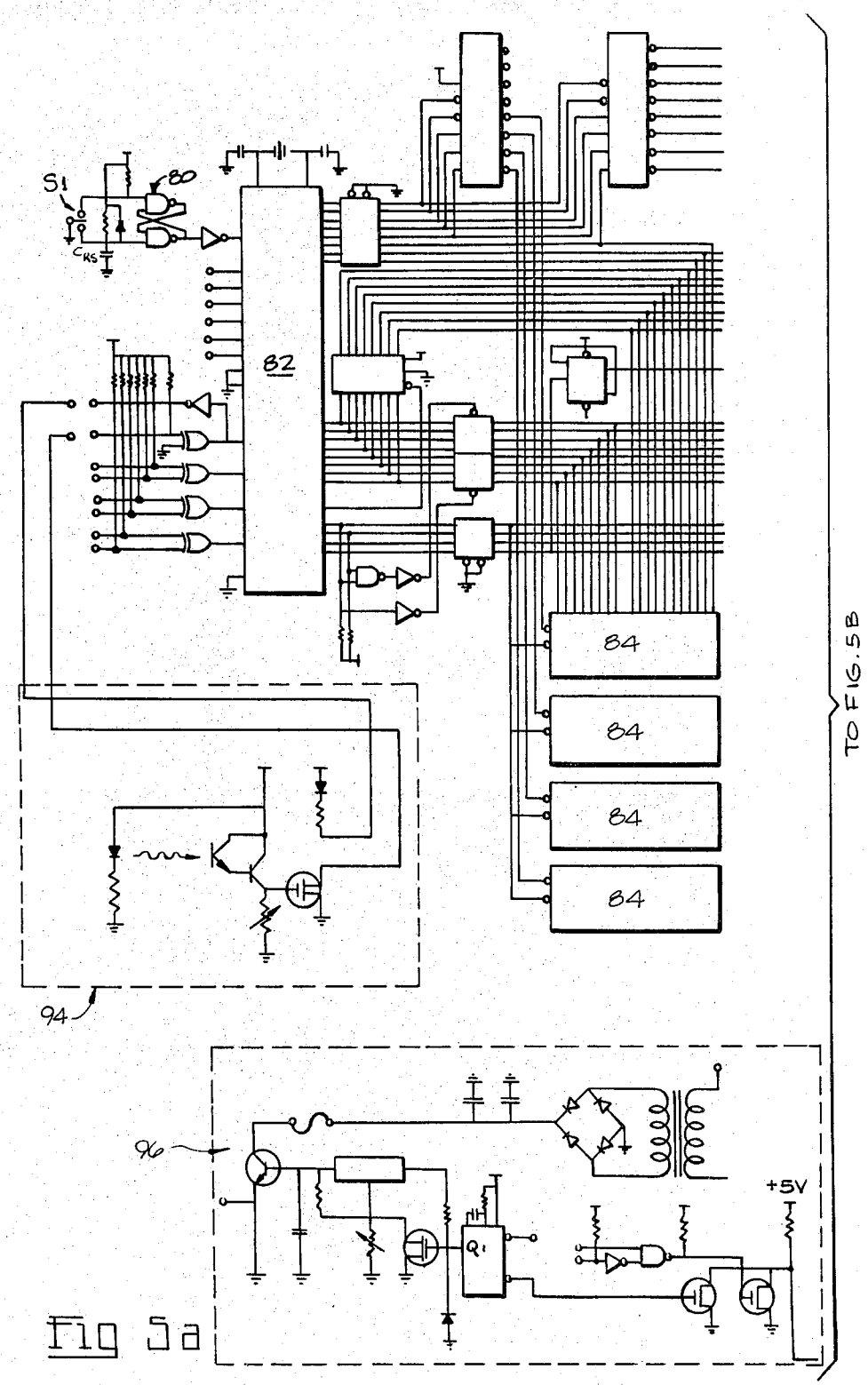
Figure 5C:
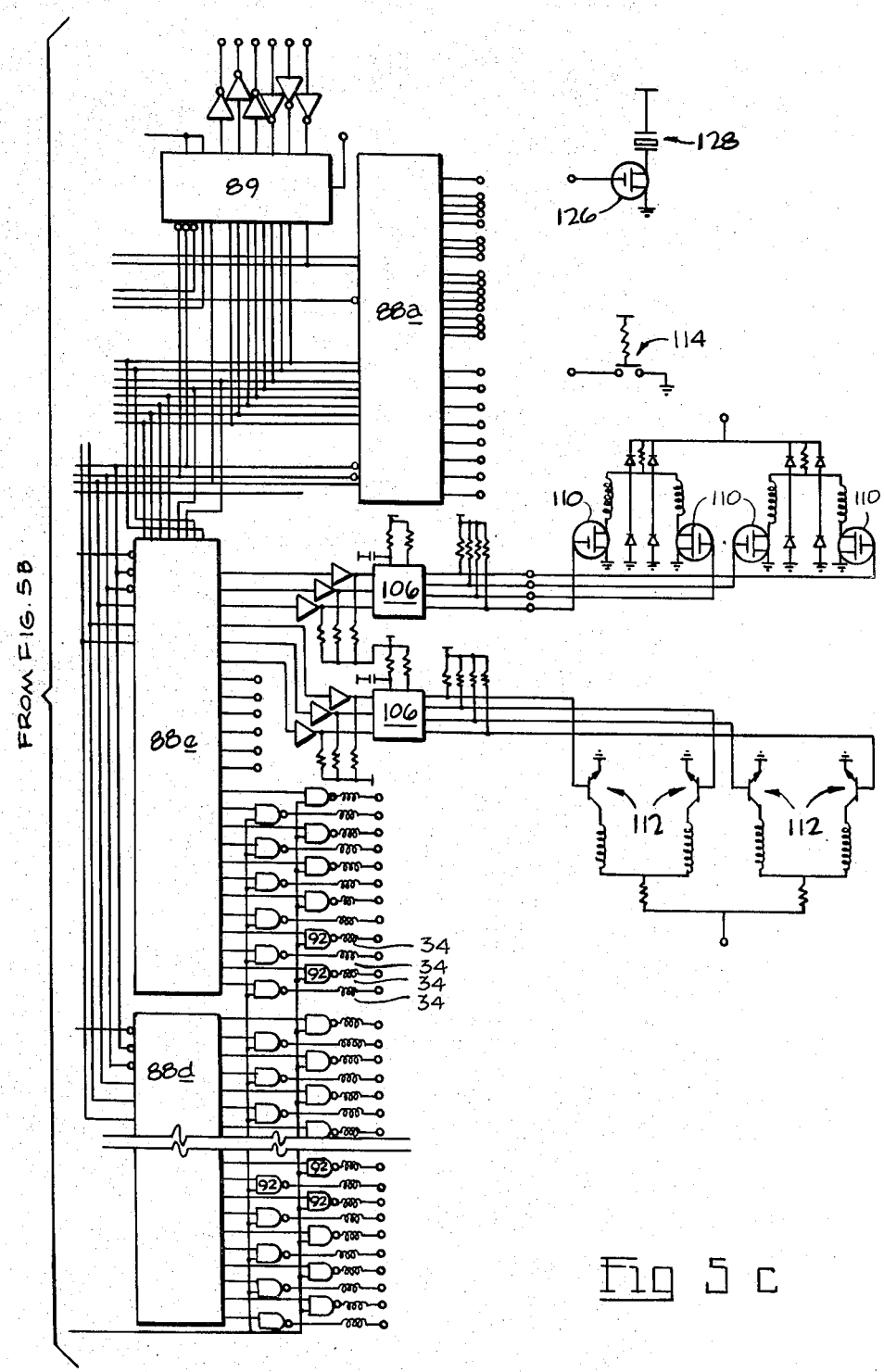

The control facility, which is shown in greater detail in FIG. 5, operates in the following general manner.

When power is first applied, the system is automatically reset by the charging action of a capacitor $C_{RS}$ which switches a flip-flop 80 and delivers a reset pulse to the CPU 82. Switch S1 is then placed in an operating position. The CPU can be subsequently reset during operation by switching switch S1 to its reset position.

The CPU 82 then starts executing program code according to software stored in the EPROM 84 which controls printer operation and contains the CGROM pattern information for the different print styles.

The CPU 82 first initializes all timers 86 and the I/O ports 88, selects the font according to prevailing position of a front panel switch (not shown), and sets the carriage position via stepping motor 60. To reset the print head position, the stepping motor 60 is instructed to drive the carriage 14 as far in one direction as possible. The motor 60 keeps on stepping a sufficient number of steps to ensure that, regardless of the start position, the carriage 14 reaches a position in which the rubber grommet 68 is hard up against the collar 69. The carriage is then moved back a predetermined distance to a start position about which it can oscillate. Subsequent control is provided by the timers 86.

The CPU 82 then waits for ASCII serial data from the USART which is controlled by one of the timers 86 or for parallel data from I/O port 88a. Characters received are placed in a buffer in RAM 90 until a carriage return character is received. The CPU 82 looks up the bit pattern from the EPROM 84 for those characters stored and places those patterns in another buffer area of RAM 90. The CPU then outputs the appropriate 84 bits for a line of print to the I/O ports 88b through 88e, sets the print timers 86 for the required print time at the selected print styli 28, and proceeds with other tasks such as reorganizing data, collecting more ASCII characters, etc.

When gates 92 controlling the print styli 28 receive an enable pulse, those gates controlling print styli selected by the I/O ports 88 are switched on. Each gate 92 incorporates a transistor (not shown) having its collector connected to a coil 34. When the gate 92 is switched, this transistor is rendered conducting, the 20 volts supply then going to ground through the print coil 34 creating magnetic flux and so magnetizing the associated print stylus 28. At the end of the print period timer, 86 interrupts the CPU 82 whereupon the CPU moves the carriage one step.

A number of outputs from I/O port 88e are used to provide timing for the stepping motors 60 and 64. To speed up onset of slew mode of the stepping motor 60, accurate timing of the four phases of drive current to the motor must be achieved and rise and fall times of current to the motor must be minimized. The four phases required are generated by timing logic 106 (IC's AA 1027). Windings of carriage stepping motor 60 are driven through rapidly acting VMOS FET's 110 while those of paper stepping motor 64 are driven somewhat more slowly through relatively slower acting bipolar transistors 112. After each print step, the CPU loads in the next 84 data bits and sets the timer again. This cycle of operations continues until the entire character line is printed whereupon the stepping motor 64 steps and the printer is ready to print another line of ASCII characters.

Special control characters embedded in the ASCII data can force the CPU to use special fonts, to advance paper, to print raw data for facsimile, to change resolution, etc. by overriding front panel selector switches (not shown).

The CPU provides drive pulses for reversing carriage direction and advancing paper when so required. The roll of MPOP may be rapidly advanced any time by pressing a front panel button 114 connected to a terminal of I/O port 88a.

I/O chip 88a has a terminal connected to a FET 126 which controls an alarm comprising a piezoelectric crystal vibrator 128 which operates under certain fault conditions. This chip also has an 8 bit parallel input port, together with hand-shaking and baud select terminals for the USART.

Other terminals connected to front panel switches (not shown) provide the capacity for changing font, resolution, etc., although as indicated previously selection can be overcome if incoming data carries an instruction to that effect.

Networks 94 and 96 which represent respectively a MPOP supply monitor and voltage overload protector are not central to the invention and therefore are not described in detail.

What is claimed is:

1. A terminal comprising:
   writing means for recording information on magnetic particle oriented paper;
   elongate erasing means for erasing information recorded on the paper;
   means for advancing a sheet of said magnetic particle oriented paper past the writing means and the erasing means;
   means for reciprocating said writing means in a direction perpendicular to the direction of advance of said sheet and parallel to the plane of the sheet at the writing means; and
   means for longitudinally reciprocating said erasing means in a direction perpendicular to the direction of advance of the sheet and parallel to the plane of the sheet at the erasing means;
   wherein said erasing means is spaced from the writing means and comprises a plurality of permanent magnets arranged to produce at a portion of the paper adjacent to the erasing means a magnetic field having a predominant component in a plane parallel to the paper, a flux pattern of the field being such that on reciprocation of said erasing means, said portion of paper is subjected to a rotating magnetic field substantially in the plane of the paper, the field being sufficiently intense to reorient magnetic particles contained within the paper so that north-south polar axes thereof are parallel to the plane of the paper.

2. A terminal as claimed in claim 1, in which the writing means consists of a plurality of linearly spaced writing elements.

3. A terminal as claimed in claim 2 in which each of said writing elements comprises an elongate stylus of high magnetic permeability, low magnetic coercivity material, and the writing means includes energizing means for selectively magnetizing said styli, and a high permeability member located on the distal side of said magnetic particle oriented paper from said styli, the styli and said member such as to produce a magnetic flux generally perpendicular to the magnetic oriented paper when said styli are magnetized.

4. A terminal as claimed in claim 1, in which said means for longitudinally reciprocating said writing means operates in stepwise manner.

5. A terminal as claimed in claim 1, in which the permanent magnets are bar magnets, having north-south polar axes parallel to each other and to the plane of the sheet but alternately inverted along the elongate erasing means, the erasing means having opposed edges, each edge characterized by an alternating succession of north and south poles.

6. A terminal as claimed in claim 1, in which said means for reciprocating said writing means includes a drive means, said drive means being common to said means for longitudinally reciprocating said erasing means.

* * * * *